United States Patent
Zhang et al.

(10) Patent No.: US 9,708,916 B2
(45) Date of Patent: Jul. 18, 2017

(54) TURBINE BUCKET PLENUM FOR COOLING FLOWS

(71) Applicant: GENERAL ELECTRIC COMPANY, Schenectady, NY (US)

(72) Inventors: Xiuzhang James Zhang, Greenville, SC (US); Lisa DeBellis, Greenville, SC (US); Haiping Wang, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 359 days.

(21) Appl. No.: 14/335,047

(22) Filed: Jul. 18, 2014

(65) Prior Publication Data

US 2016/0017718 A1    Jan. 21, 2016

(51) Int. Cl.
*F01D 5/18* (2006.01)

(52) U.S. Cl.
CPC .......... *F01D 5/187* (2013.01); *F05D 2230/11* (2013.01); *F05D 2230/12* (2013.01); *F05D 2230/21* (2013.01); *F05D 2240/81* (2013.01)

(58) Field of Classification Search
CPC .. F01D 5/187; F05D 2240/81; F05D 2230/11; F05D 2230/21; F05D 2230/12
See application file for complete search history.

(56) References Cited

U.S. PATENT DOCUMENTS

| | | |
|---|---|---|
| 5,382,135 A | 1/1995 | Green |
| 6,416,284 B1 | 7/2002 | Demers et al. |
| 7,309,212 B2 | 12/2007 | Itzel et al. |
| 7,416,391 B2 | 8/2008 | Veltre et al. |
| 7,513,738 B2 | 4/2009 | Itzel et al. |
| 8,641,368 B1 | 2/2014 | Liang |
| 8,641,377 B1 | 2/2014 | Liang |
| 9,121,292 B2 * | 9/2015 | Zhang .......... F01D 5/186 |
| 2009/0202339 A1 | 8/2009 | Torii et al. |
| 2012/0082567 A1 | 4/2012 | Tibbott et al. |
| 2014/0154063 A1 * | 6/2014 | Zhang .......... F01D 5/186 415/177 |
| 2014/0178198 A1 * | 6/2014 | Bluck .......... F01D 5/187 416/1 |

* cited by examiner

*Primary Examiner* — Ryan J Walters
(74) *Attorney, Agent, or Firm* — Nixon & Vanderhye P.C.

(57) ABSTRACT

A casted turbine bucket having at least one machined plenum including a plenum chamber and at least one plenum passage connected to a plenum inlet at a root portion of turbine bucket, and a method to feed cooling flow to the turbine bucket using the machined plenum that receives cooling flow from the root portion of the turbine bucket.

13 Claims, 4 Drawing Sheets

TURBINE BUCKET PLENUM FOR COOLING FLOWS

TECHNICAL FIELD

The present invention relates to gas turbines. The invention particularly relates to providing cooling flow to cooling passages in the turbine buckets and to the bucket platforms.

BACKGROUND OF THE INVENTION

The turbine section of gas turbine is subjected to high temperature during operation. The rotating portion of the turbine includes a series of wheels arranged on a shaft. The rim of the wheels includes an annular array of dovetail slots configured to receive the dovetail portion of turbine buckets. The turbine buckets extend outward from the rim of the wheel into a hot gas passage through the turbine. The buckets on each wheel form a row of buckets in the turbine. Hot combustion gases flowing through the hot gas passage apply aerodynamic forces to the buckets that cause the buckets, wheels and shaft to rotate to drive a compressor and an external device, such as an electrical generator.

The turbine section includes rows of vanes mounted to a stationary turbine casing. Each row of vanes extends inwardly from the casing into the hot gas passage. Rows of vanes alternate with the rows of buckets. The vanes turn and guide the gases flowing through the hot gas passage into each successive row of buckets.

The hot combustion gases can overheat and damage the turbine bucket. To avoid overheating and heat damage, the buckets are cooled by cooling gases flowing through internal passages in the buckets.

Referring to FIG. 1, a turbine bucket 10 includes an airfoil 12, a shank portion 14, a platform 16, and a root portion 18. The turbine buckets 10 are especially susceptible to deterioration along the platform 16 of the bucket 10.

Turbine bucket deterioration would cause a decrease in the gas turbine efficiency, and would require replacements. Material cost to replace a deteriorated bucket is commonly high, and replacing turbine buckets would require an outage in the gas turbine operation. Hence, the cost to operate a gas turbine would increase due to the replacement material costs.

It has been a continuous search for improvements to resolve durability issues of the turbine buckets. A higher durability of the turbine buckets would require fewer replacements of the buckets, and lower the operation costs of a turbine.

Turbine buckets are generally casted with set number of air duct or cooling passages inside the turbine buckets. Different types of cooling passages are casted into the turbine buckets depending upon cooling needs.

Many have attempted in providing cooling to the bucket platforms. Cooling passages on the platform are generally provided with cooling fluid, such as air flow, that is obtained from an air duct which is casted into the root portion, the airfoil portion, or both the root and the airfoil portions.

Attempts to resolve the issue of turbine bucket platform cooling have been described in, for example, U.S. Pat. Nos. 8,641,368; 8,641,377; 2012/0082567; 7,416,391; 7,309,212; 5,382,135; 2009/0202339; 6,416,284; and J.P. Patent Pub. No. 2008202547.

BRIEF DESCRIPTION OF THE INVENTION

The present invention relates to methods and apparatuses for adding or modifying cooling passages in a cast turbine bucket. The present invention provides tunable plenum(s) for delivering cooling flow in a turbine bucket to provide a cooling effect that counteracts with the high temperature environment. The tunable plenums are machined into casted turbine buckets, and may be used as new turbine buckets, or to improve and retrofit turbine buckets that are currently in operation.

An embodiment of a casted turbine bucket having at least one machined plenum includes a turbine bucket that is already casted, and into which at least one plenum is machined into the turbine bucket. The plenum includes at least one plenum chamber, at least one plenum passage, and an inlet at the root portion of the turbine bucket.

A method to supply additional cooling flow to a casted turbine bucket includes machining at least one new plenum inside a turbine bucket, which has at least one plenum chamber, at least one plenum passage, and an inlet at a root portion of the turbine bucket; connecting the turbine bucket to a turbine wheel that has a cooling flow source inside the wheel; and redirecting cooling flow to enter the inlet of the plenum at the root portion of the turbine bucket towards the plenum chamber inside the turbine bucket.

DETAILED DESCRIPTION OF THE INVENTION

Figure 1:
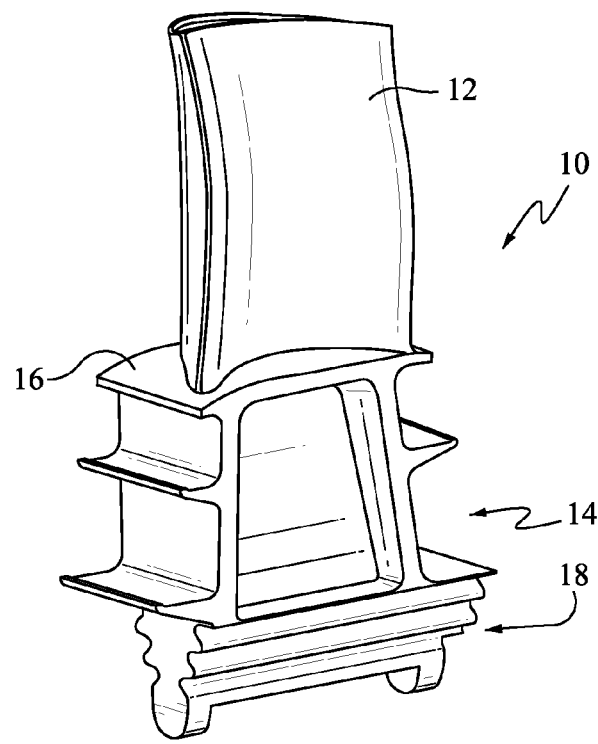
FIG. 1 is an illustration of a conventional turbine bucket.
Figure 2:
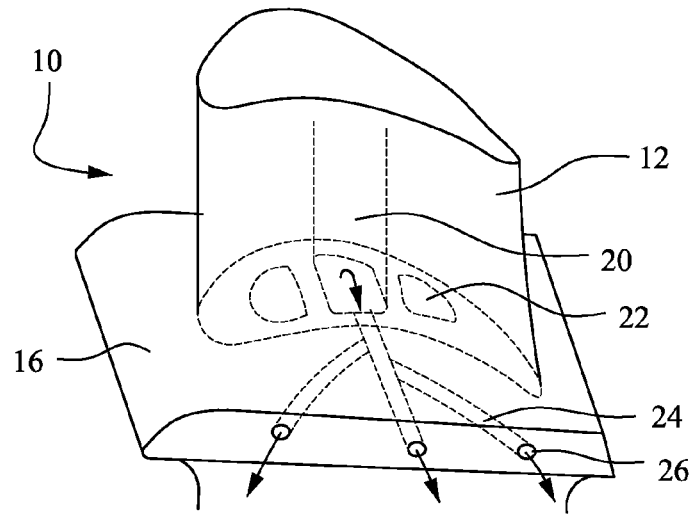
FIG. 2 is a transparent view of an airfoil and platform portions of a turbine bucket, depicting conventional casted cooling passages.

A conventional turbine bucket 10 is shown in FIG. 2, which generally includes an airfoil 15 located on a surface of the bucket platform 16. The turbine bucket 10 may have a main air duct 20 that is already casted into the bucket, such as through the airfoil 12 as shown. The main air duct 20 may be used to provide cooling liquid flow to the airfoil 12, and also provide cooling flow to the cooling passages 24 in the platform. Other air ducts 22 may also be casted into the bucket 10, and may also supply cooling fluid to the cooling passages 24, or only to the airfoil 12.

Cooling fluid flow may be redirected from the main air duct 20 into the connected cooling passages 24, and the cooling flow may exit through holes 26 on the side of the platform 16 or on the surface of the platform 16. The main air duct 20 may include a radial through hole that extends into the airfoil portion 12 above the platform portion 16. The radial through hole would allow cooling flow to enter the airfoil 12, such as shown in FIG. 2.

However, as cooling needs on a turbine bucket change due to improvements in the gas turbine or due to imprecision during casting of the turbine buckets, the casted air ducts 20, 22 may not be sufficient to supply cooling fluid flow to the desired locations on the turbine bucket.

As known in the field, a turbine bucket is also known as turbine blade; a turbine vane is also known as a turbine nozzle; a shank portion is also known as a neck portion; and a root portion is also known as a dovetail of the turbine bucket. These terms may be used interchangeably throughout the descriptions. Corresponding parts on different embodiments are numbered similarly.

Figure 3:
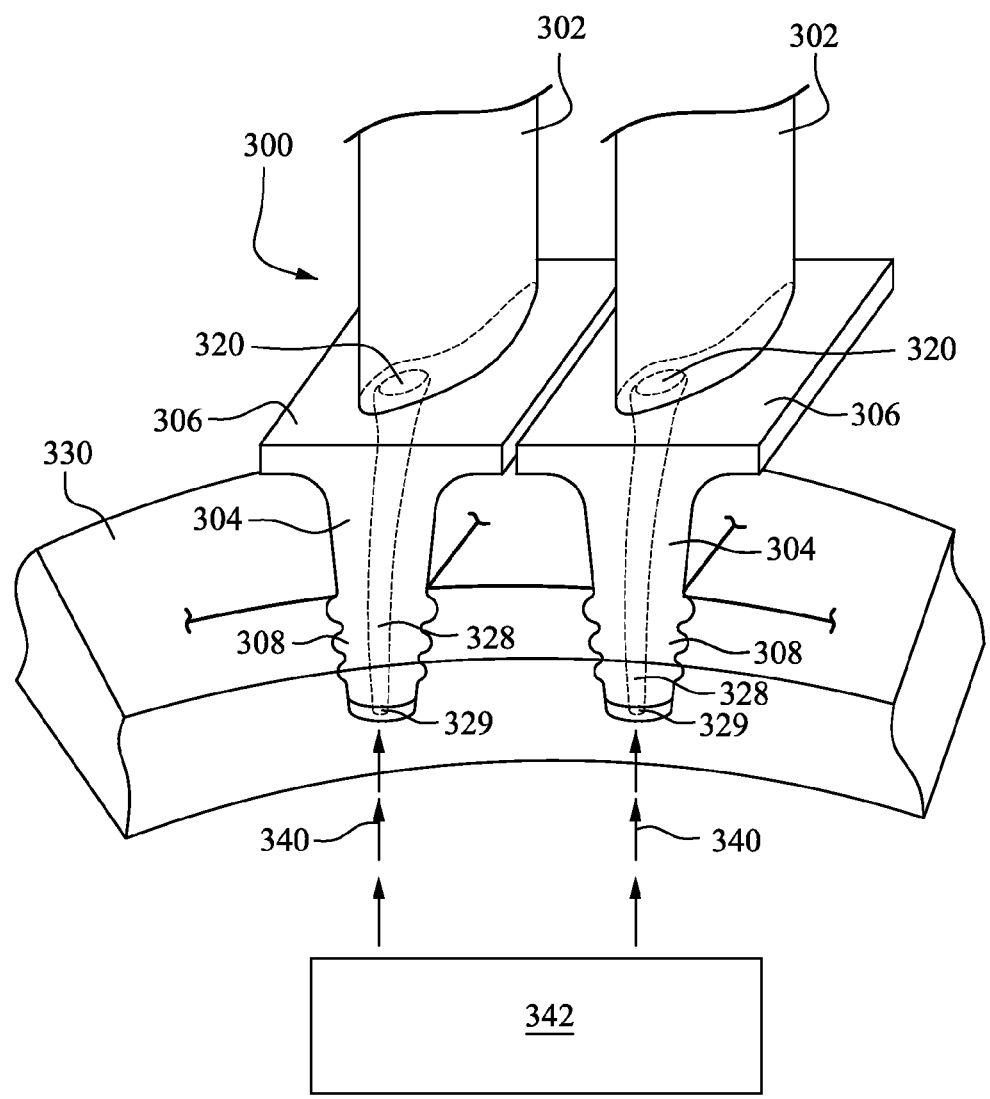
FIG. 3 is a side view of an exemplary pair of turbine buckets located on a turbine wheel, showing an embodiment of the present invention.

FIG. 3 provides a schematic view of two exemplary turbine buckets 300 located on a wheel 330 in a gas turbine. Only the outer rim of the wheel 330 is shown. The wheel 330 may include a disc with a center aperture to receive a shaft of the gas turbine. The outer rim is usually integral with the disc. On each wheel 330, the turbine buckets 300 are placed side-by-side form an annular array of buckets 300 that constitute a row of buckets in the turbine. The turbine buckets 300 may each be independently placed on the wheel 330. The turbine buckets include an airfoil portion 302, a platform portion 306, a shank portion 304 and a root portion 308.

The turbine buckets 300 may be machined after casting to have additional one or more internal plenums inside the buckets 300. An internal plenum in this context does not include passages that extend radially. One or more internal plenums may be machined to connect horizontal cooling passages and cooling holes that are arranged in the platform portion 306 of the turbine bucket 300.

The internal plenums include internal plenum chambers 320 connected to the root portion 308 by internal plenum passages 328. The internal plenum passages include inlets 329 at or radially inward of the rim of the wheel 330. These inlets 329 are open or otherwise in fluid communication with sources of cooling air 342, such as compressor air ducted from the gas turbine compressor to passages in the turbine that are radially inward of the hot gas passage. Cooling air 340 flows into the inlet 329 and through the internal plenum passage 328, through the internal plenum chambers 320, through any internal cooling passages in the platform 306 and the airfoil 302 of the buckets, then may be exhausted from these cooling passages into, for example, the hot gas passage. The plenum chambers 320 and plenum passages 328 may also cool other portions of the turbine bucket 300 as needed, or act as cooling passages by themselves, to supply cooling to desired parts of the turbine bucket.

The plenum chambers 320 and plenum passages 328 may be created by displacing material from the buckets 300 by using any machining processes, including a Shaped-Tube Electrochemical Machining (STEM) process, an Electrical Discharge Machining (EDM) process, other Electrochemical Machining (ECM) processes, and a combination thereof.

As an example, an embodiment preferably is made using a STEM process to create a new plenum that includes a plenum chamber and a plenum passage. Using the STEM process, a plenum may be machined into a turbine bucket by putting a turbine bucket into an acidic liquid, and through an electrolytic process, displacing material from predetermined locations inside the turbine bucket.

A source of cooling fluid flow 342, such as a rotor cooling circuit of the gas turbine, may supply cooling flow 340 to the turbine buckets 300 from within or attached to the wheel 330 of a gas turbine. The cooling flow 340 may be redirected into the plenum passage 320 at the root portion 308 of the turbine bucket 300, where feed pressure of the cooling flow 340 may be well defined in the gas turbine. The inlet 329 to the plenum passage 328 may be at the tip of the root portion 308, along an outer periphery of the root portion 308, or otherwise suitably supplied on the root portion 308.

Figure 4:
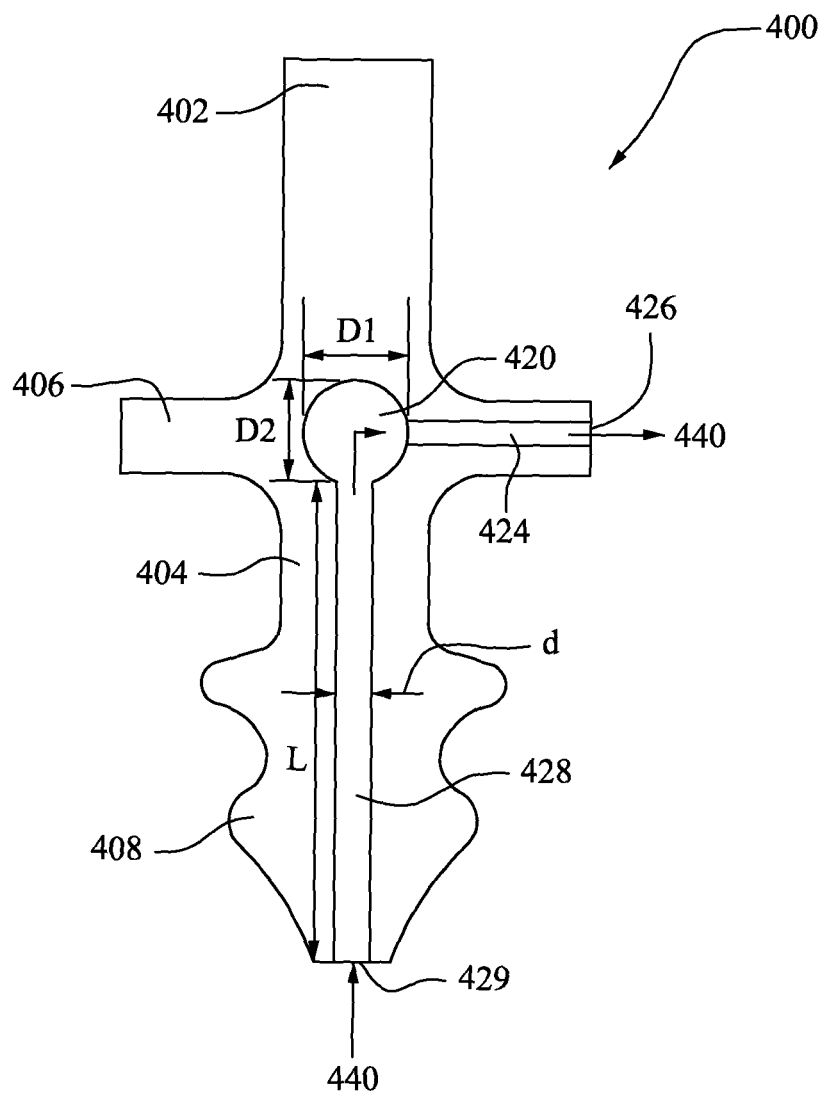
FIG. 4 is a cross-sectional view of a turbine bucket along a vertical axis of the turbine bucket, showing a second embodiment of the present invention.

FIG. 4 provides a cross-sectional view of an exemplary turbine bucket 400 that shows a plenum having a plenum chamber 420 that is connected to a root portion 408 of the turbine bucket 400 using a plenum passage 428, including a plenum inlet 429 at the root portion 408. The plenum chamber 420 is also connected to a cooling passage 424 in the platform 426.

In an embodiment, sizes of a plenum chamber 420 and plenum passage 428 may be defined relatively. A plenum chamber 420 may have a horizontal dimension (D1), and a radial dimension (D2). Similarly, a plenum passage 428 may have a diameter (d) along a length (L) of the passage 428. The length (L) may be defined between the plenum chamber 420 and the plenum inlet 429 in the turbine bucket 400.

The horizontal dimension (D1) of the plenum chamber 420 may be larger than or equal to 1.2 times the diameter (d) of the plenum passage 428 (e.g., D1≥1.2*d), and the radial dimension (D2) of the plenum chamber 420 may also be larger than or equal to 1.2 times the diameter (d) of the plenum passage 428 (e.g., D2≥1.2*d). In another embodiment, D1 and D2 of a plenum chamber 420 may not be the same. Diameter (d) may not be the same throughout the entire length (L) of the plenum passage 428.

Figure 5:
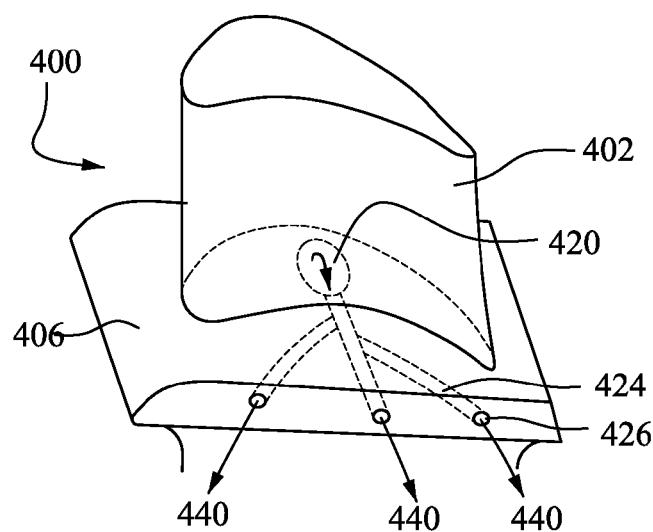
FIG. 5 is a transparent view of an airfoil and platform portions of a turbine bucket, depicting an embodiment including cooling passages.

Although only one cooling passage 424 is shown in FIG. 4, there may be multiple cooling passages 424 in the turbine bucket 400. The plenum chamber 420 may provide cooling flow 440 to one or more cooling passages 424 in the turbine bucket 400, such as shown in FIG. 5. One plenum chamber 420 may supply cooling flow 440 to more than one cooling passages 424 in the platform 406, and the cooling flow 440 may exit the cooling passages 424 through cooling holes 426 at the end of the platform 406.

In an embodiment, the plenum may not include a radial through hole extending into the airfoil portion 402. Without a radial through hole extending from the plenum, such as extending from the plenum chamber 420, cooling flow 440 may be fully redirected into one or more cooling passages 424 that are connected to the plenum chamber 420.

In another embodiment, cooling holes 426 may also be situated on the surface of the platform 406 that faces the airfoil 402 to provide cooling flow to the airfoil 402. Similarly, cooling holes 426 may also be supplied to provide film cooling to the platform 402. Furthermore, any arrangement of cooling passages 424 and cooling holes 426 may be supplied by the plenum chamber 420 and the plenum passage 428.

Figure 6:
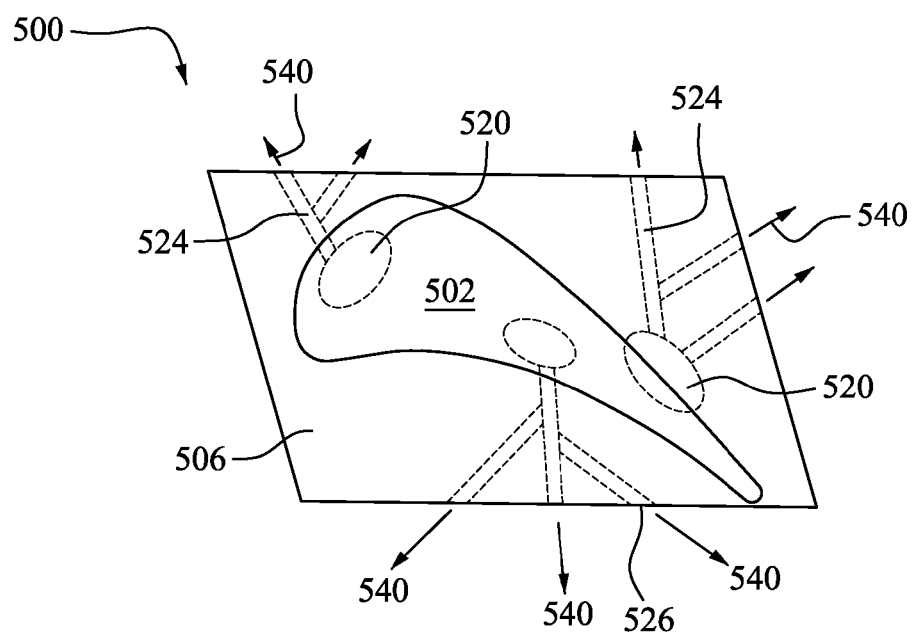
FIG. 6 is a transparent cross-sectional view taken along a surface of the platform facing the airfoil, depicting another embodiment including several plenums.

Referring to FIG. 6, there may be more than one plenum chamber 520 machined into a turbine bucket 500. Each of the plenum chambers 520 may be utilized to supply cooling flow 540 to more than one cooling passages 524. The plenum chambers 520 may be machined into any desired location in the turbine bucket 500 that is suitable for supplying cooling flow 540 to desired cooling passages 524 and locations on the bucket 500.

Furthermore, each plenum chamber 520 may be connected to one plenum passage, or multiple plenum chambers 520 may be connected to one plenum passage. The arrangement of plenum chambers 520 and plenum passages may be determined as needs occur, and is not limited to one particular arrangement.

Moreover, the plenum chamber and the plenum passage may not be similar shaped, and may not be confined to a particular shape. The plenum and plenum passage may be machined to have a rectangular shape, a cylindrical shape, a cone shape, a pyramid shape, a hexagonal shape, any other suitable shapes, or a combination thereof. In addition, the plenum passage may also be curved. The plenum chamber and passage may also be provided in different parts of the turbine bucket for cooling purposes, such as in the shank, the airfoil, the platform, and the root portions.

Advantages to machining additional plenums that may or may not coincide with the existing air duct in casted turbine buckets include: providing additional cooling flow supply to cooling passages as desired when turbine operation needs change; providing additional cooling flow supply to newly proposed cooling passages as turbine buckets are improved; improving on poorly constructed turbine buckets that have misplaced air ducts during casting; and providing additional cooling to the turbine bucket using the machined plenum passages and plenum chambers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to machine a casted turbine bucket having an airfoil portion, a platform portion, and a dovetail, the dovetail has a fir tree shape that is formed to connect to a turbine wheel that rotates around a rotational axis, and the dovetail is aligned to a line extending normal to the rotational axis, the method comprising:
    machining an internal plenum into the turbine bucket, wherein the internal plenum includes a plenum chamber in the platform portion, a plenum passage extending through the dovetail along the line from a plenum inlet to the plenum chamber;
    wherein the plenum inlet is aligned to the line and provided at the dovetail, the plenum is aligned to the line and provided at a central location of the platform portion, and the line extends through the plenum inlet, the plenum chamber, and the airfoil portion.

2. The method of claim 1, wherein the internal plenum is machined using a process that is a Shaped-Tube Electrochemical Machining (STEM) process, an Electrical Discharge Machining (EDM) process, an Electrochemical Machining process, or a combination thereof.

3. The method of claim 1, wherein the plenum inlet at the dovetail is connected to a cooling flow source.

4. The method of claim 1 further comprising at least one cooling passage in the turbine bucket.

5. The method of claim 4, wherein the internal plenum is connected to the at least one cooling passage in the turbine bucket.

6. The method of claim 1, wherein the internal plenum has a shape that is rectangular, conical, cylindrical, hexagonal, curved, pyramid, or a combination thereof.

7. The method of claim 1, wherein the internal plenum includes a plurality of plenum passages connected to the plenum chamber.

8. The method of claim 1, wherein the plenum passage is connected to a plurality of plenum chambers.

9. The method of claim 1, wherein the internal plenum does not coincide with at least one casted air duct inside the turbine bucket.

10. The method of claim 1, wherein the plenum chamber is machined to have a horizontal dimension and a radial dimension, and the dimensions are larger than or equal to 1.2 times of a diameter of the plenum passage.

11. The method of claim 1, wherein the plenum passage does not have a consistent diameter throughout an entire length of the passage between the plenum chamber and the plenum inlet.

12. The method of claim 1, wherein the internal plenum does not include a radial through hole that extends into the airfoil portion.

13. The method of claim 1 further comprising at least one additional plenum chamber machined inside the platform portion, and the at least one additional plenum chamber is located in an off-center location in the platform portion that does not align with the line.

* * * * *